US011578255B2

United States Patent
Favero et al.

(10) Patent No.: US 11,578,255 B2
(45) Date of Patent: Feb. 14, 2023

(54) METHOD FOR ENHANCED OIL RECOVERY BY MEANS OF INJECTION OF AN AQUEOUS POLYMER COMPOSITION HAVING MONOMERIC UNITS FROM AN LCST

(71) Applicant: SPCM SA, Andrezieux Boutheon (FR)

(72) Inventors: Cédrick Favero, Andrezieux Boutheon (FR); Olivier Braun, Andrezieux Boutheon (FR); Thierry Leblanc, Andrezieux Boutheon (FR)

(73) Assignee: SPCM SA, Andrezieux Boutheon (FR)

( * ) Notice: Subject to any disclaimer, the term of this patent is extended or adjusted under 35 U.S.C. 154(b) by 0 days.

(21) Appl. No.: 17/288,099

(22) PCT Filed: Nov. 4, 2019

(86) PCT No.: PCT/FR2019/052607
§ 371 (c)(1),
(2) Date: Apr. 23, 2021

(87) PCT Pub. No.: WO2020/094961
PCT Pub. Date: May 14, 2020

(65) Prior Publication Data
US 2021/0380868 A1 Dec. 9, 2021

(30) Foreign Application Priority Data
Nov. 6, 2018 (FR) .................................. 1860203

(51) Int. Cl.
*E21B 43/16* (2006.01)
*C09K 8/588* (2006.01)
(52) U.S. Cl.
CPC .............. *C09K 8/588* (2013.01); *E21B 43/16* (2013.01)
(58) Field of Classification Search
CPC ................................ C09K 8/588; E21B 43/16
See application file for complete search history.

(56) References Cited

U.S. PATENT DOCUMENTS

| 8,186,871 B2 | 5/2012 | Pich et al. |
| 2008/0096774 A1* | 4/2008 | Tabary ................... C09K 8/512 507/221 |
| 2011/0118152 A1* | 5/2011 | Braun ...................... C08J 3/075 507/219 |
| 2013/0108173 A1 | 5/2013 | Lienhart et al. |
| 2016/0214896 A1* | 7/2016 | Cadix .................... C04B 28/02 |

FOREIGN PATENT DOCUMENTS

| WO | 95/26455 A1 | 10/1995 | |
| WO | 02/055607 A1 | 7/2002 | |
| WO | 2010/133258 A1 | 11/2010 | |
| WO | 2013/108174 A1 | 7/2013 | |
| WO | 2014/047243 A1 | 3/2014 | |
| WO | 2014/166858 A1 | 10/2014 | |
| WO | WO-2015189060 A1 * | 12/2015 | ............. C09K 8/588 |
| WO | 2016/162532 A1 | 10/2016 | |
| WO | 2018/020175 A1 | 2/2018 | |
| WO | 2018/172682 A1 | 9/2018 | |

OTHER PUBLICATIONS

International Search Report (and English translation) and Written Opinion of the International Searching Authority for International Application No. PCT/FR2019/052607 dated Feb. 13, 2020.
Thomas, S., et al., "Enhanced Oil Recovery—An Overview", Oil & Gas Science and Technology—Rev. IFP, vol. 63, No. 1, pp. 9-19 (2007).

* cited by examiner

*Primary Examiner* — Silvana C Runyan
(74) *Attorney, Agent, or Firm* — Heslin Rothenberg Farley & Mesiti P.C.

(57) ABSTRACT

This invention relates to a process of enhanced oil recovery by sweeping an underground formation comprising injecting into the underground formation an injection fluid comprising at least one water-soluble LCST macromonomeric polymer.

20 Claims, No Drawings

METHOD FOR ENHANCED OIL RECOVERY BY MEANS OF INJECTION OF AN AQUEOUS POLYMER COMPOSITION HAVING MONOMERIC UNITS FROM AN LCST

CROSS REFERENCE TO RELATED APPLICATIONS

This application is a national stage filing under section 371 of International Application No. PCT/FR2019/052607 filed on Nov. 4, 2019, and published on May 14, 2020 as WO 2020/094961, which claims priority to French Application No. 1860203, filed on Nov. 6, 2018. The entire contents of WO 2020/094961 are hereby incorporated herein by reference.

FIELD OF THE INVENTION

This invention relates to the technical field of enhanced oil recovery in a reservoir. More specifically, this invention relates to an improved process for enhanced oil recovery by sweeping an underground formation by means of introducing an injection fluid comprising at least one water-soluble polymer with LCST macromonomers into the reservoir. An injection fluid comprising said polymer constitutes an additional subject-matter of the invention.

PRIOR ART

Most of the oil fields currently in operation have matured and have, in fact, started to decline in production or are about to do so. The recovery rate of these fields is currently on the order of 15 to 35% on average compared to the initial quantity of oil. Therefore, they still offer a considerable production potential.

In general, the recovery of crude oil contained in reservoirs is carried out in several stages.

First of all, the production results from the fluid's natural energy and the decompressed rock. At the end of this depletion phase, the quantity of oil recovered on the surface represents on average about 5 to 15% of the initial reserve. In a second step, employment of techniques aimed at increasing the recovery yield by maintaining the pressure of the field is therefore necessary.

The process most frequently implemented consists of injecting water into the reservoir through injection wells dedicated for this purpose. This is called secondary recovery. This second phase ends when the water/oil ratio is too high, i.e., when the quantity of water in the mixture produced by the producing oil wells is too high. Thus, this secondary recovery makes it possible to obtain an additional recovery rate on the order of 10 to 20%.

Other techniques that may be used are grouped under enhanced oil recovery (RAP or EOR, the acronym for "Enhanced Oil Recovery"). Their goal is to recover between 10 and 35% of oil in addition to the initial quantity of oil. Various thermal techniques are known under the term enhanced oil recovery, or others such as electric, miscible, steam, or chemical techniques of "enhanced oil recovery" remain in place (see "Oil & gas science and technology"—IFP review, vol. 63 (2008) No. 1, pp 9-19).

The term "petroleum" denotes any type of oil, namely light oil as well as heavy oil, or even bituminous oil. An oil generally results from the natural transformation of organic matter and comprises a mixture of hydrocarbons. In the description of the prior art or invention, the terms "petroleum" and "oil" denote the same material.

This invention relates more specifically to enhanced oil recovery by chemical means involving the injection of an aqueous injection fluid comprising at least one water-soluble polymer into an underground formation, said fluid being able to sweep the underground formation, and therefore to push the oil out of the rock.

The subject-matter of the invention is not to gel the polymer to modify the rock's permeability and plug the holes; a technique referred to as "profile control" or plugging waterways.

The objective of the invention is to provide an improvement in the sweeping efficiency in a process for enhanced oil recovery by chemical means through improving mobility control.

A distinction is made between enhanced oil recovery techniques (EOR for Enhanced Oil Recovery) and reservoir stimulation operations. The latter is characterized by limited volume injections of the polymer solution to create a localized phenomenon in the reservoir. For the structure, areas of high permeability from a water injector well are blocked off, while for "water shut off" there is a direct injection duct plug in producing oil wells. The injections are generally made from an injection well or from producing wells over the relatively short duration of a few days and generally less than one month. With volumes of composition injected that represent less than 5% of the reservoir's pore volume. The pore volume corresponds to the volume not occupied by the rock in the reservoir, which is a permeable zone.

In contrast, the techniques of enhanced oil recovery by sweeping (EOR) using polymers involve a continuous and prolonged injection of polymer solution to sweep the reservoir from an injection well to a producing well. The goal is not to treat an area of the reservoir but to sweep its entire area to recover as much oil as possible. To do this, a much larger volume of aqueous solution must be injected, generally between 30% and 500%, or even more, of the pore volume. An aqueous, oily, and sometimes gaseous mixture is recovered at the level of the producing wells.

In all of these techniques, the efficiency of sweeping by water injection is generally improved by adding water-soluble polymers. The expected and proven benefits of using these polymers, through their ability to viscosify injection fluids, improve sweeping and mobility control in the field to recover a maximum of oil quickly and effectively.

It is known to those skilled in the art that synthetic water-soluble polymers, and in particular those based on acrylamide, are very advantageous polymers for increasing the viscosity of aqueous solutions and are in fact mainly used in enhanced oil recovery. Recently, many solutions have been proposed to improve these processes, particularly in developing new generation polymers.

The document WO 2014/166858 describes a process for enhanced oil recovery using copolymers having an isomolar proportion of ATBS and NVP that offer improved temperature stability. The document US 2013/108173 describes the use of ACMO-based copolymers having very good resistance to temperature and salinity. The document WO 20131/08174 describes polymers as having very good resistance to iron.

Unlike the documents mentioned above, document WO 2016/162532 does not describe a process for enhanced oil recovery by sweeping but a process for deflecting an underground formation by means of a polymer capable of forming temporary deflection gels in situ. These polymers are obtained from macromonomers with an LCST (lower critical temperature of demixing, from the acronym "Lower Critical Solution Temperature"), allowing the polymers to gel in situ when the polymer meets sufficient temperature conditions.

LCST technology is widely applied to polymers to give them the ability to transform into physical gels to block or plug conduits, pipes, or any other porous material. This technology is used in particular in construction.

The LCST technology applied to the polymers used in oil extraction makes it possible to temporarily or permanently obstruct underground formations through gelation of the injection fluid containing a thermosensitive polymer that, under the action of heat, will turn into a gel.

Although significant progress has been made in recent years concerning enhanced oil recovery by sweeping, water-soluble polymers do not yet provide optimum sweeping efficiency and mobility control, particularly when subjected to difficult conditions. This is typically the case when the polymers encounter high temperature and/or high salinity conditions. A significant amount of residual oil, which is difficult to recover today, then remains in the formations treated.

The problem this invention proposes to solve is to improve the efficiency of the sweeping and the mobility control provided by water-soluble polymers in the processs of enhanced oil recovery by sweeping the underground formation.

DISCLOSURE OF THE INVENTION

The Applicant has surprisingly discovered that this is possible by means of the use of a water-soluble copolymer comprising a homeopathic dose of LCST macromonomers.

The term "homeopathic dose" is understood to mean an extremely small amount compared to the other constituents of the water-soluble copolymer.

It is due to a homeopathic dose of the latter that it is possible to obtain water-soluble copolymers having a rheological profile such that the injection fluids containing them offer optimized sweeping and mobility control, particularly at high temperatures (thermosensitive) and/or high salinity (sensitive to salt (s)).

More specifically, this invention relates to a process for enhanced oil recovery by sweeping an underground formation comprising the following steps:
preparing an aqueous injection fluid comprising at least one water-soluble copolymer,
injecting the injection fluid into an underground formation,
sweeping the underground formation using the injected fluid,
recovering an aqueous and oily and/or gaseous mixture,
the water-soluble copolymer containing monomeric units resulting from:
  a) at least one water-soluble monomer bearing at least one unsaturated function; and
  b) at least one LCST macromonomer in an amount greater than $10^{-5}$ mol % and less than $10^{-1}$ mol % based on the total number of moles of water-soluble monomer(s) and LCST macromonomer(s).

For greater clarity, "water-soluble copolymer" denotes the water-soluble copolymer used in this invention. On the other hand, "water-soluble monomer(s)" and "macromonomer(s)" respectively denote "at least one water-soluble monomer" and "at least one macromonomer."

The water-soluble copolymer is a polymer of at least one water-soluble monomer and at least one LCST macromonomer. It is therefore obtained from at least one water-soluble monomer and at least one LCST macromonomer. Thus, it contains monomeric units derived from the stated monomer(s) and macromonomer(s). In other words, the water-soluble copolymer is a copolymer of at least one water-soluble monomer bearing at least one unsaturated function capable of being polymerized to form a water-soluble backbone and of at least one LCST macromonomer.

The term "water-soluble copolymer" denotes a copolymer making it possible to obtain an aqueous solution when it is dissolved with stirring at 25° C. and with a concentration of 50 $gL^{-1}$ in water.

As defined by the IUPAC, a macromonomer is a polymer or an oligomer bearing a terminal group that acts as a monomer. Thus, each polymer or oligomer corresponds to a monomer unit in the chain of the final polymer.

According to an advantageous embodiment, the molar percentage of units (monomer units) derived from LCST macromonomers in the copolymer is greater than $10^{-4}$ mol % relative to the total number of moles of monomer units of monomers and LCST macromonomers, preferably greater than $10^{-3}$ mol %, even more preferably greater than $5.10^{-3}$ mol %. The molar percentage of units derived from LCST macromonomers in the copolymer is preferably less than $9.10^{-2}$ mol % relative to the total number of moles of monomers and LCST macromonomers, preferably less than $8.10^{-2}$ mol %, more preferably less than $6.10^{-2}$ mol %, even more preferably less than $5.10^{-2}$ mol %, even more preferably less than $4.10^{-2}$ mol %.

In general, the amount of monomer units of a monomer (monomer or macromonomer) corresponds to the amount of this monomer used in the polymer's preparation. This definition is applicable for preparing the water-soluble copolymer or of the macromonomer and, therefore, the oligomer (see below).

The invention also relates to an injection fluid intended for use in an enhanced oil recovery process by sweeping comprising a water-soluble copolymer having monomeric units derived from:
a) at least one water-soluble monomer bearing at least one unsaturated function; and
b) at least one LCST macromonomer in an amount greater than $10^{-5}$ mol % and less than $10^{-1}$ mol % based on the total number of moles of water-soluble monomers and LCST macromonomers.

The LCST Macromonomer and its Synthesis

Concerning the presence of units derived from an LCST macromonomer in an extremely small amount, the copolymer used has the double advantage of not turning into a gel in the underground formation and of giving the injection fluid containing it, improved sweeping and mobility control properties.

According to the general knowledge of those skilled in the art, the LCST groups correspond to groups whose solubility in water for a determined concentration is modified beyond a certain temperature and as a function of the salinity. These groups exhibit a transition temperature by heating that defines their lack of affinity with the solvent medium. The lack of affinity with the solvent results in opacification or loss of transparency.

The minimum transition temperature is called "LCST" (lower critical demixing temperature, from the acronym "Lower Critical Solution Temperature"). For each LCST group concentration, a heating transition temperature is observed. It is greater than the LCST, which is the minimum point of the curve. Below this temperature, the copolymer is soluble in water. Above this temperature, the copolymer loses its solubility in water.

Usually, the LCST may be measured visually: the temperature at which the lack of affinity with the solvent appears is determined, i.e., the cloud point. The cloud point corresponds to the opacification of the solution or loss of transparency.

The LCST may also be determined according to the type of phase transition, such as DSC (differential scanning calorimetry, from the acronym "Differential Scanning Calorimetry"), by measurement of transmittance, or by a measurement of viscosity.

Preferably, the LCST is determined by determining the cloud point by transmittance according to the following protocol.

The transition temperature is measured for an LCST compound for a solution having a mass concentration in deionized water of 1% by weight of said compound. The cloud point corresponds to the temperature at which the solution exhibits a transmittance equal to 85% of light rays having a wavelength between 400 and 800 nm.

In other words, the temperature at which the solution exhibits a transmittance equal to 85% corresponds to the compound's minimum LCST transition temperature, in this case of the LCST macromonomer.

In general, a transparent composition exhibits a maximum light transmittance value, at any wavelength between 400 and 800 nm, through a sample 1 cm thick, of at least 85%, preferably at least 90%. This is the reason why the cloud point corresponds to a transmittance of 85%.

In general, the LCST macromonomer is obtained by synthesizing an LCST oligomer with a functional end and then by grafting an ethylenic group onto this functional end.

Therefore, mention may be made, by way of example, of the synthesis of the LCST macromonomer from an LCST oligomer of controlled size and functionality, performed using a radical or ionic initiator having the desired chemical function, and/or by introducing a transfer agent substituted by the desired chemical group and/or by polycondensation.

LCST monomers capable of being used to manufacture the LCST oligomer, which is used to obtain the LCST macromonomers, are preferably selected from N-isopropyl acrylamide; N,N-dimethyl acrylamide; acryloyl morpholine; N,N-diethyl acrylamide; N-tert-butyl acrylamide; N-vinyl caprolactam; and diacetone acrylamide.

In the context of the invention, the LCST oligomer advantageously comprises between 10 mol % and 100 mol % of monomer(s) comprising an LCST unit, more advantageously between 40 mol % and 100 mol % and even more advantageous between 50 mol % and 100 mol % relative to the total number of moles of monomers in the oligomer. According to a particular embodiment, the LCST oligomer may, in particular, comprise 90 to 96 mol % of monomer(s) comprising an LCST unit.

In addition to the LCST monomers, water-soluble monomers capable of being used to manufacture the LCST oligomer are preferably selected from non-ionic monomers, anionic monomers, cationic monomers, and zwitterionic monomers. They are preferably selected from non-ionic monomers and anionic monomers.

In the context of the invention, the LCST oligomer advantageously comprises between 0 mol % and 90 mol % of this (these) (non-ionic and/or anionic and/or cationic and/or zwitterionic) monomer(s), more advantageously between 0 mol % and 60 mol % and even more advantageously between 0 mol % and 50 mol % relative to the total number of moles of monomers in the oligomer. According to a particular embodiment, the LCST oligomer may, in particular, comprise 4 to 10 mol % of this monomer(s). These monomers may be hydrophilic or hydrophobic in nature.

Thus, the LCST oligomer, and therefore the LCST macromonomer, is obtained from at least one LCST monomer and, optionally, at least one water-soluble monomer. Thus, it contains monomeric units derived from the stated monomer(s) and macromonomer(s).

The water-soluble monomer may be a non-ionic monomer which may, in particular, be selected from the group comprising water-soluble vinyl monomers, and in particular, acrylamide. Thus, the LCST oligomer may comprise a non-ionic monomer advantageously selected from the group comprising acrylamide; methacrylamide; N-vinylformamide; and N-vinylpyrrolidone.

The water-soluble monomer may also be an anionic monomer. The anionic monomer(s) which may be used in the context of the invention may be selected from a large group. These monomers may have acrylic, vinyl, maleic, fumaric, malonic, itaconic, or allylic functions and contain a carboxylate, phosphonate, phosphate, sulfate, sulfonate, or another group with an anionic charge. The anionic monomer may be in the form of an acid or an alkaline earth metal or an alkali metal, or ammonium salt (advantageously quaternary). Examples of suitable monomers include acrylic acid; methacrylic acid; itaconic acid; crotonic acid; maleic acid; fumaric acid; monomers of strong acid type exhibiting, for example, a function of sulfonic acid or phosphonic acid type, such as 2-acrylamido 2-methylpropanesulfonic acid, vinylsulfonic acid, vinylphosphonic acid, allylsulfonic acid, allylphosphonic acid, styrene sulfonic acid; and the water-soluble salts of these monomers such as their alkali metal, alkaline earth metal, or ammonium (preferably quaternary) salts.

Optionally, the LCST oligomer may comprise at least one cationic monomer.

The water-soluble monomer may optionally be a cationic monomer of acrylamide, acrylic, vinyl, allylic or maleic type having an amine or quaternary ammonium function. Mention may be made, in particular and without limitation, of dimethylaminoethyl acrylate (ADAME) and quaternized or salified dimethylaminoethyl methacrylate (MADAM), dimethyldiallylammonium chloride (DADMAC), acrylamido propyltrimethyl ammonium chloride (APTAC), and methacrylamido propyltrimethyl ammonium chloride (MAPTAC).

Monomers of a hydrophobic nature may also be used and selected in particular from monomers of acrylamide, acrylic, vinyl, allylic or maleic type having a pendant hydrophobic function. Specifically, it may be a butyl methacrylate monomer.

According to a preferred embodiment, the LCST oligomer is a polymer of an LCST monomer (preferably N-isopropylacrylamide), of an anionic monomer (preferably acrylic acid), and a monomer with a hydrophobic nature (preferably butyl methacrylate).

Thus, according to another preferred embodiment, the LCST oligomer is a polymer of an LCST monomer (preferably N-isopropylacrylamide) of a cationic monomer (preferably MADAM.MeCl) and a monomer having a hydrophobic nature (preferably butyl methacrylate).

Regarding the synthesis of the LCST macromonomer, in a first step, mention may be made of telomerization, which is a process of synthesizing LSCT oligomers of low molar masses (called telomeres).

According to the invention, the LCST macromonomer has a molecular weight preferably between 500 g/mol and 200,000 g/mol, more preferably between 1,000 g/mol and 100,000 g/mol, even more preferably between 1,500 g/mol and 100,000 g/mol. Molecular weight is understood to be the average molecular weight.

The telogen agents may be selected, among other things, from thiols, alcohols, disulfides, phosphorus, boron, and halogen derivatives. They may, in particular, make it possible to introduce specific functions at the end of the telomere chains, for example, silanes, trialkoxysilanes, amines, epoxy, hydroxyl, phosphonate, or acid functions.

Once these LCST oligomers have formed, in a second step, a vinyl double bond ($R_1R_2C=CR_3$-, $R_1$, $R_2$, and $R_3$ being a hydrogen atom or a hydrocarbon-based group independent of each other or otherwise which may comprise heteroatoms) may be introduced at the end of the chain so that they serve as LCST macromonomers which may, in turn, be polymerized.

According to another process of synthesis, an LCST macromer is obtained by a controlled radical polymerization called RAFT (reversible chain transfer by addition-fragmentation, standing for "reversible-addition fragmentation chain transfer") of LCST monomers in the presence of at least one crosslinking agent. The macromonomer thus obtained is therefore structured and may serve as a core for obtaining water-soluble copolymers in star-shaped form. The crosslinking agent may be selected from the group comprising polyethylene unsaturated monomers (having at least two unsaturated functions), such as, for example, vinyl, allylic and acrylic functions, and methylene bis acrylamide (MBA) may be mentioned, for example.

The same technique may be used to obtain an LCST macromonomer but without the use of a crosslinking agent.

Many reactions may be implemented for couplings on monomers: alkylation, esterification, amidation, transesterification, or transamidation.

In a preferred embodiment, the preparation of the LCST macromonomer is carried out by radical reaction between an LCST oligomer and a compound containing a double bond, the double bond still being present after said radical reaction. Advantageously, the LCST oligomer has the characteristic of having a nitrogen or oxygen atom at its end, such as an alcohol or amine function, which is functionalized via the compound containing a double bond. This compound containing a double bond is preferably selected from acryloyl chloride, acrylic acid, methacryloyl chloride, methacrylic acid, maleic anhydride, methacrylic anhydride, unsaturated aliphatic isocyanates, allyl chloride, allyl bromide, glycidyl acrylate, and glycidyl methacrylate.

According to a particular embodiment, the LCST macromonomer may be of formula (I):

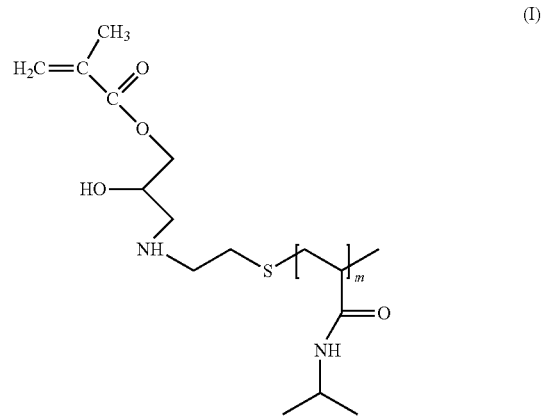

Wherein:
m is an integer advantageously between 2 and 40.

In general, the LCST groups of the water-soluble copolymer have a heating transition temperature of 0° C. to 180° C. for a mass concentration in deionized water of 1% by weight of said LCST groups, preferably between 0° C. and 100° C., even more preferably between 10° C. and 60° C.

Water-Soluble Copolymer and its Synthesis

According to one embodiment of the invention, the water-soluble copolymer may be obtained by copolymerization of at least one type of water-soluble monomer bearing at least one unsaturated function and at least one LCST macromonomer. In other words, the water-soluble monomer(s) and the LCST macromonomers are polymerized simultaneously in a reactor. The polymer chain is formed gradually in the presence of water-soluble monomers and LCST macromonomers.

According to another embodiment, a water-soluble copolymer (the backbone) is first obtained by polymerization of the water-soluble monomers. Then in a second step, the LCST oligomers are grafted onto said copolymer. Those skilled in the art know the techniques allowing the grafting of LCST macromonomers onto a copolymer. We may cite, for example, the patent WO 2014/047243, which describes this technique.

According to a third embodiment, a water-soluble copolymer is obtained by polymerizing the water-soluble monomers on the macromonomer with a structured LCST obtained in the presence of a crosslinking agent by controlled radical polymerization (RAFT). The copolymers thus obtained are therefore star-shaped with an LCST core.

The invention is not limited to these processs to obtain the copolymer.

The water-soluble monomers bearing at least one unsaturated function capable of being used to manufacture the water-soluble copolymer are preferably selected from non-ionic monomers, anionic monomers, cationic monomers, and zwitterionic monomers. They are preferably selected from non-ionic monomers and anionic monomers.

The water-soluble monomer may be a non-ionic monomer that may be selected from the group comprising water-soluble vinyl monomers, and in particular, acrylamide; methacrylamide; N-vinylformamide; N-vinylpyrrolidone. Advantageously, the non-ionic monomer is acrylamide.

The water-soluble monomer may also be an anionic monomer. The anionic monomer(s) which may be used in the context of the invention may be selected from a large group. These monomers may have acrylic, vinyl, maleic, fumaric, malonic, itaconic, or allylic functions and contain a carboxylate, phosphonate, phosphate, sulfate, sulfonate, or another group with an anionic charge. The anionic monomer may be in the form of an acid or an alkaline earth metal or an alkali metal, or ammonium salt. Examples of suitable monomers include acrylic acid; methacrylic acid; itaconic acid; crotonic acid; maleic acid; fumaric acid; strong acid monomers of the type exhibiting, for example, a function of sulfonic acid or phosphonic acid, such as 2-acrylamido 2-methylpropanesulfonic acid, vinylsulfonic acid, vinylphosphonic acid, allylsulfonic acid, allylphosphonic acid, styrene sulfonic acid; and the water-soluble salts of these monomers such as their alkali metal, alkaline earth metal or ammonium (advantageously quaternary) salts.

Optionally, the backbone of the water-soluble copolymer may comprise at least one cationic monomer.

The water-soluble monomer may optionally be a cationic monomer of acrylamide, acrylic, vinyl, allylic or maleic type having an amine or ammonium function (for example, a quaternary ammonium). Mention may be made, in particular and without limitation, of quaternized or salified dimethyl-aminoethyl acrylate (ADAME) and dimethylaminoethyl methacrylate (MADAME), dimethyldiallylammonium chloride (DADMAC), acrylamido propyltrimethyl ammonium chloride (APTAC), and methacrylamido propyltrimethyl ammonium chloride (MAPTAC).

According to a particular embodiment, the water-soluble copolymer advantageously comprises up to 99.99999 mol % of anionic monomer(s) relative to the total number of monomers. The copolymer advantageously comprises a large amount of anionic monomer, preferably greater than 30 mol %, preferably greater than 50 mol %, even more preferably greater than 70 mol %. This amount will be all the more important as the copolymer will encounter high temperature and/or high salinity conditions in the underground formation.

When the water-soluble copolymer comprises at least one non-ionic monomer, the latter is preferably present between 1 and 70 mol %, more preferably between 20 and 50 mol %, relative to the total number of monomers.

When the water-soluble copolymer comprises at least one cationic monomer, the latter is preferably present in an amount of less than 5 mol %.

The water-soluble copolymer may be obtained by radical polymerization. Polymerization techniques such as controlled radical polymerization known as RAFT (Reversible Addition-Fragmentation Chain Transfer), NMP (polymerization in the presence of nitroxides, which stands for "Nitroxide Mediated Polymerization") or ATRP (Atom Transfer Radical Polymerization), may be used to obtain the water-soluble copolymer.

In general, the copolymer does not require the development of a particular polymerization process. Indeed, it may be obtained by following all the polymerization techniques well-known to those skilled in the art. It may specifically be solution polymerization; gel polymerization; precipitation polymerization; emulsion polymerization (aqueous or reverse); suspension polymerization; reactive extrusion polymerization; water-in-water polymerization; or micellar polymerization.

The polymerization is preferably carried out in reverse emulsion followed or not by a concentration step or by the gel route.

According to the invention, the copolymer may be in liquid, gel, or solid form (powder or ball) when its preparation includes a drying step such as "spray drying," drum drying, radiation drying, such as microwave drying, or even drying in a fluidized bed.

According to the invention, the water-soluble copolymer advantageously has a molecular weight of at least 0.5 million g/mol, preferably between 0.5 million and 40 million g/mol, more preferably between 5 million and 30 million g/mol. Molecular weight is understood to be the average molecular weight.

The intrinsic viscosity of the copolymer determines molecular weight. The intrinsic viscosity may be measured by processs known to those skilled in the art. It may be calculated from the values of reduced viscosity for different copolymer concentrations through a graphic process consisting of identifying the values of reduced viscosity (y-axis) in the concentration (x-axis) and extrapolate the curve to zero concentration. The intrinsic value of the viscosity is read on the y-axis or using the process of least squares. The Mark-Houwink equation may then determine the molecular weight:

$$[\eta] = K M^\alpha$$

[$\eta$] represents the intrinsic viscosity of the copolymer determined by the solution viscosity measurement process, K represents an empirical constant (K=3.73, $10^{-4}$), M represents the molecular weight of the copolymer, $\alpha$ represents the Mark-Houwink coefficient ($\alpha$=+0.66), K and $\alpha$ depend on the specific copolymer-solvent system.

Property of the Water-Soluble Copolymer

The water-soluble copolymer exhibits a given mass concentration in an aqueous solution and beyond a given critical temperature, association properties.

These properties of association by heating that are observed beyond the transition temperature of the LCST chains generate sticky points between the main chains and slow down the creeping of the chain.

A slowing down of chain creeping in a porous medium generates an increase in the reduction in mobility, which is sought in enhanced oil recovery by sweeping ("polymer flooding").

In the process according to the invention, sweeping of the underground formation is carried out by injecting the aqueous injection fluid containing the water-soluble copolymer into the formation. The gradual change up to the temperature of the underground formation allows the association of the polymer chains. It is generally between 20° C. and 200° C.

The associating effect of the water-soluble copolymer may be adapted to the nature of the underground formation (temperature), in particular, according to the nature of the LCST macromonomer, the molar amount of the LCST macromonomer, the salinity, and/or the pH of the water used to prepare the aqueous injection fluid to be injected, or the concentration of copolymer.

According to an advantageous embodiment, the water-soluble copolymer has an association temperature advantageously between 25° C. and 160° C., preferably greater than 40° C. (40° C.<temperature ≤160° C.), more preferably above 60° C. (60° C.<temperature ≤160° C.), even more preferably above 80° C. (80° C.<temperature ≤160° C.), even more preferably above 90° C. (90° C.<temperature ≤160° C.).

Advantageously, the association effect occurs instantly once the injection fluid has reached the copolymer's association temperature after injection into the underground formation to be treated.

Enhanced Oil Recovery Process by Sweeping

Surprisingly, the Applicant has discovered that the water-soluble copolymer is particularly suitable for use in enhanced oil recovery processes by sweeping an underground formation.

The use of LCST macromonomers in an extremely small amount in the copolymer makes a particular technical effect possible. The water-soluble copolymer makes it possible to obtain a completely unexpected, particularly effective rheological profile for sweeping the underground formation.

As mentioned above, and without being linked to any theory, it seems that the properties of association by heating observed beyond the transition temperature of the LCST chains generate sticky points between the main chains of the copolymers according to the invention and slower chain creeping.

This slowing down of chain creeping thus generates, in a porous medium, a rise in the reduction of mobility and thus greater efficiency when sweeping the underground formation.

The water-soluble copolymer is particularly interesting and effective when the field conditions are difficult. For example, when the underground formation temperature is high and/or the salinity is high of the aqueous injection fluid in which the copolymer is found.

In one particular embodiment of the invention, the process comprises the treatment of an underground formation having a maximum temperature of between 25° C. and 160° C., preferably greater than 40° C., more preferably greater than 60° C., again more preferably greater than 80° C., even more preferably greater than 90° C.

The concentration of water-soluble copolymer in the aqueous injection fluid is advantageously between 50 and 50,000 ppm by weight, preferably between 100 and 30,000 ppm, more preferably between 500 and 10,000 ppm relative to the weight of the injection fluid.

The water or brine used for the preparation of the injection fluid may be production water. The term "production water" is understood to mean all saline or unsalted water, brines, seawater, and aquifer water from a hydrocarbon reservoir. This production water may be treated prior to the injection fluid preparation as described in patent application WO 2018/020175.

In one particular embodiment of the invention, the process comprises treating an underground formation with an aqueous injection fluid comprising more than 5% by weight of salts, preferably more than 7%, even more preferably more than 10%.

The water-soluble copolymers, according to the invention, may be combined with stabilizing compounds. The stabilizing compounds (stabilizing agents) may be compounds that adequately protect the copolymers against thermal, chemical, and/or mechanical degradation. Examples of suitable stabilizing agents are provided in the patent application WO 2010/133258.

The SP (Surfactant Polymer) and ASP (Alkaline Surfactant Polymer) techniques or any other technique well-known to those skilled in the art may be implemented with the same principle according to the invention.

Advantageously, the injection fluid has, at the time of its injection, a viscosity of between 1 and 200 cps (centipoise) (viscosity measurements at 20° C. with a Brookfield viscometer with a UL module and at a speed of 6 rotations per minute).

The water-soluble copolymer's implementation is advantageously carried out on-site, just upstream of its injection into the reservoir. In general, all the components introduced into the water or the brine to constitute the injection fluid are most often added into a circulation line for the aqueous solution or the brine.

When the water-soluble copolymer is in the form of particles, it may be dissolved in an aqueous medium within a dispersing device. An example of a dispersing device is the polymer slicing unit (PSU) described in U.S. Pat. No. 8,186,871, which allows the preparation of a concentrated aqueous polymer solution.

In addition to the water-soluble copolymer, the injection fluid may also comprise one or more chemical compounds useful for improved oil recovery and well-known to those skilled in the art. Among these chemical compounds, mention may be made of using a weak, strong or super-strong mineral or organic base that can saponify crude oil and form in situ surfactant species that solubilize petroleum. By way of example, among these are found sodium carbonate, caustic soda, borate and metaborate compounds, amines, basic polymeric species.

Another family of compounds widely injected with polymers is that of surfactant compounds, often anionic, zwitterionic, cationic, and sometimes also non-ionic. These compounds are rarely injected in a pure form but rather with a co-surfactant and a co-solvent to improve their compatibility and their efficiency in the reservoir.

Another aspect of the invention relates to an injection fluid comprising the water-soluble copolymer as described above. The injection fluid comprises at least one water-soluble copolymer in the proportions described above and at least water or brine. Optionally, it comprises other components such as, for example, a base as described above, one or more surfactants as described above, co-solvents, or other water-soluble (co)polymers.

The invention and the advantages that result therefrom will emerge more clearly from the following examples given to illustrate the invention in a non-limiting manner.

Examples of Embodiment of the Invention

1/Synthesis of Telomers (or LCST Oligomers)

The following process to produce a Telomere called T1 is performed.

In a jacketed reactor:

A hydroalcoholic solution (410 g) is loaded into the reactor, as well as the N-isopropylacrylamide monomers (NIPAM, 113 g, or 1 mol), butyl methacrylate (7.9 g, or 0.055 mol), and acrylic acid (4.44 g, or 0.055 mol).

The mixture is stirred.

The pH is continuously adjusted between 4.0 and 5.0 using a 40% NaOH solution by weight in water.

The mixture obtained is heated to 50° C.

It is deoxygenated with nitrogen bubbling for 40 minutes.

Aminoethanethiol HCl (2.5 g) is added.

2,2'-azobis (2-methylpropionamidine) dihydrochloride (0.22 g) is added to initiate telomerization. After stabilizing the temperature, the mixture is stirred for 2 hours and then cooled to 25° C.

A concentrated, viscous solution is obtained containing 23% by weight of a telomer with a degree of polymerization of 50 monomeric units (DPn 50). The LCST of this T1 telomere was estimated at 38° C. according to the process described above.

The following process to produce a Telomere called T2 is performed.

In a jacketed reactor:
In 445 g of a hydroalcoholic solution, the monomers N-isopropylacrylamide (NIPAM, 113 g, or 1 mol), butyl methacrylate (4.44 g, or 0.031 mol), and chloromethylated dimethylamino-ethyl methacrylate (MADAM.MeCl, 2.16 g, or 0.01 mol).
The mixture is stirred.
The pH is continuously adjusted between 4.0 and 5.0 using a 40% NaOH solution by weight in water.
The mixture obtained is heated to 50° C.
It is deoxygenated with nitrogen bubbling for 40 minutes.
Aminoethanethiol HCl (2.35 g) is added.
2,2'-azobis(2-methylpropionamidine)dihydrochloride (0.22 g) is added to initiate polymerization. After stabilizing the temperature, the mixture is stirred for 2 hours and then cooled to 25° C.

A concentrated, viscous solution is obtained containing 21% by weight of a telomer with a degree of polymerization of 50 monomeric units (DPn 50). The LCST of this T2 telomere was estimated at 32° C. according to the process described above.

TABLE 1

List and monomeric compositions of T1 and T2 telomeres

| Telomere | LCST monomer (A), mol % | Hydrophilic Monomer (B), mol % | Hydrophobic Monomer (C), mol % | LCST Telomere (° C.) |
|---|---|---|---|---|
| T1 | NIPAM, 90 | Acrylic acid, 5 | Butyl methacrylate, 5 | 38 |
| T2 | NIPAM 96 | MADAM.MeCl, 1 | Butyl methacrylate, 3 | 32 |

2/Synthesis of Macromonomers

The following process to produce a macromonomer called M1 is performed.

In a jacketed reactor:
400 g of a 23% Telomere T1 solution (5581 g/mol) by weight in water is added.
The solution is stirred.
The pH is adjusted to 7.5 using a 40% NaOH solution by weight in water.
Cooled to 5° C.
Using a burette, 3.0 g of acryloyl chloride is added drop by drop.
The pH is continuously adjusted between 7 and 9 using a 40% NaOH solution by weight in water.
The temperature is maintained at 5° C. throughout the reaction.
The mixture is left stirring for 2 hours after the end of the reaction while continuing to check the pH.

A concentrated, viscous solution is obtained containing 21.5% LCST macromonomer M1 by weight (5711 g/mol).

The M2 macromonomer is made by the same process, with the T2 telomer (5740 g/mol). A concentrated, viscous solution is obtained containing 21.5% LCST macromonomer M2 by weight (5869 g/mol).

3/Synthesis of Polymers

A—Polymer in Powder Form Obtained by Gel Polymerization

The following process is carried out to produce a polymer called P1 from the macromonomer M1.

173 g of acrylamide, 186 g of ATBS (2-acrylamido 2-methylpropane sulfonic acid), 1.4 g (or 0.0075 mol % relative to the number of monomer mol) of LCST macromonomer M1, and 640 g of deionized water are loaded into a beaker to prepare the aqueous solution of monomers. The pH of the monomer solution is adjusted to 7 using a 40% NaOH solution by weight in water. It is cooled to a temperature of 5° C.

The following additives are then added:
30 ppm of Versenex 80 (complexing agent),
250 ppm AZDN (azo-bis-isobutyronitrile) (azo initiator),
2 ppm of TBHP (terbutylhydroperoxide) (oxidant).

The solution is cooled to 10° C., then is transferred to a heat-insulated reactor. The solution is deoxygenated with an inert gas for 15 minutes. 4 ppm of Mohr salts are added to initiate the polymerization reaction. This polymerization takes place under adiabatic conditions until the temperature of 85° C. is reached. Once the polymerization is complete, the reaction medium is left to stand for 12 hours. The gel obtained is then ground, dried in an oven. A white powder is recovered.

The P2 polymers are produced using the same process as with the M2 macromonomer. A white powder is obtained.

As a counterexample, the polymers P3 and P4 are produced according to the same process, respectively, with the macromonomer M1 and M2. The difference is that the amount of macromonomer is $10^{-6}$ mol % relative to the total number of monomers.

Also, as a counterexample, the polymers P5 and P6 are produced according to the same process, respectively, with the macromonomer M1 and M2. The difference is that the amount of macromonomer is $2.10^{-1}$ mol % relative to the total number of monomers.

B— Polymer in Reverse Emulsion Form

The following process is performed to make an inverse emulsion called EM1.

146 g (74.997 mol %) of acrylamide, 157 g (25 mol %) of ATBS (2-acrylamido-2-methylpropane sulfonic acid), 0.5 g (0.003 mol %) of LCST macromonomer M1 and 370 g of water are loaded into a beaker to prepare the aqueous solution of monomers. The pH of the monomer solution is adjusted between 5-6 using NaOH.

The following additives are added:
0.37 g of Versenex 80 (complexing agent),
−1.29 g of TBHP (terbutylhydroperoxide) (oxidant).

295 g of Exxsol D100 and 30 g of Span 80 are mixed before being transferred to a reactor as well as the aqueous phase. Emulsification of the two-phase mixture is carried out using a mixer. This mixture is deoxygenated using an inert gas, and then it is cooled to a temperature of 15° C.

The synthesis starts with the addition of an MBS solution (sodium metabisulfite, 1 g/l) at a rate of (1 ml/min). An inverse emulsion with a polymer concentration of 30% by weight is thus obtained.

An EM2 inverse emulsion is made by the same process, with the LCST macromonomer M2. An inverse emulsion EM2 with a polymer concentration of 30% by weight is thus obtained.

As a counterexample, the emulsions EM3 and EM4 are produced according to the same process, respectively, with the macromonomer M1 and M2. The difference is that the amount of macromonomer is $10^{-6}$ mol % relative to the total number of monomers.

Also, as a counterexample, the emulsions EM5 and EM6 are produced according to the same process, respectively, with the macromonomer M1 and M2. The difference is the amount of macromonomer is $2.10^{-1}$ mol % relative to the total number of monomers.

4/Evaluation of the Behavior of Polymers in a Porous Media a Materials and Processs Several propagation experiments in porous media have been carried out to assess the propagation profile and the reduction in mobility.

The polymer solutions are prepared from powders P1 to P6 and emulsions EM1 to EM6, in a 90,000 TDS brine (Total Dissolved Solids, 90,000 mg/L of water) of the following composition: 86.23 g of NaCl, 5 g of $CaCl_2, 2H_2O$ in water for a total weight of 1000 g. The polymer concentration in these solutions is 900 ppm.

The rock used is a Bentheimer type sandstone with an average water permeability of around 1.5 Darcies. Our porous media dimensions are 1 inch (or 2.54 cm) in diameter and 3.5 inches (or 8.89 cm) long. The porous media were dried overnight in an oven before being saturated under vacuum in deoxygenated water. These porous media are placed in a Hassler cell under a confinement pressure of 50 bars. This assembly is equipped with a pressure sensor between the inlet and the outlet of the cell.

b) Test

The brine is first injected at a flow rate of 12 $cm^3/h$ to create a control. After stabilization of the signal, the polymer solution is injected. The pressure sensor will measure the pressure relative to the development of viscosity. The reduction in mobility is determined after stabilization of the signal according to the following formula:

$$Rm = \frac{\Delta P \text{ (solution de polymère)}}{\Delta P \text{ (saumure)}}$$

| Key | |
|---|---|
| Solution de Polymère | Polymer Solution |
| Brine | Brine |
| saumure | Brine |

A high Rm value is sought after because this corresponds to a good capacity provided by the polymer to sweep the rock efficiently.

c) Results

During the polymer solution injection, a rise in pressure relative to the increase in viscosity of the polymer solution is observed until the signal stabilizes. During the tests, the temperature is 80° C.

A—Polymer in Powder Form

The polymers P1 to P2 and the counterexamples P3 to P6 were tested, and the results are presented in Table 2.

TABLE 2

Results of the injections of solutions P1 to P6.

| Polymer | Macromonomer | Macromonomer (mol %) | Polymer Concentration (ppm) | Rm |
|---|---|---|---|---|
| P1 | M1 | $7.5\ 10^{-3}$ | 900 | 100 |
| P2 | M2 | $7.5\ 10^{-3}$ | 900 | 150 |
| P3 | M1 | $10^{-6}$ | 900 | 10 |
| P4 | M2 | $10^{-6}$ | 900 | 11 |
| P5 | M1 | $2.10^{-1}$ | 900 | NA |
| P6 | M2 | $2.10^{-1}$ | 900 | NA |

NA: Not Applicable. The signal is not stabilized, and therefore no Rm value may be measured. In practice, the injection of such solutions would risk damaging the rock by blocking the formation's pores. These solutions are therefore not at all suitable for enhanced oil recovery by sweeping.

The polymers P1 and P2 containing an appropriate amount of LCST macromonomer ($7.5 10^{-3}$ mol %) were observed to offer a much greater reduction in mobility than that obtained with polymers P3 and P4 containing an insufficient amount of macromonomer ($10^{-6}$ mol %). If polymers P5 and P6 contain too large a quantity of macromonomer ($2.10^{-1}$ mol %), they are not suitable for enhanced oil recovery by sweeping.

B— Polymer in Reverse Emulsion Form

The emulsions EM1 to EM2 and the counterexamples EM3 to EM6 were tested, and the results are presented in Table 3.

TABLE 3

Results of the injections of the EM1 to EM6 emulsion polymer solutions.

| Polymer | Macromonomer | Macromonomer (mol %) | Polymer Concentration (ppm) | Rm |
|---|---|---|---|---|
| EM1 | M1 | $7.5\ 10^{-3}$ | 900 | 80 |
| EM2 | M2 | $7.5\ 10^{-3}$ | 900 | 140 |
| EM3 | M1 | $10^{-6}$ | 900 | 9 |
| EM4 | M2 | $10^{-6}$ | 900 | 12 |
| EM5 | M1 | $2.10^{-1}$ | 900 | NA |
| EM6 | M2 | $2.10^{-1}$ | 900 | NA |

NA: Not Applicable. The signal is not stabilized, and therefore no Rm value may be measured. In practice, the injection of such solutions would risk damaging the rock by blocking the formation's pores. These solutions are therefore not at all suitable for enhanced oil recovery by sweeping.

The same trend is observed as in polymers P1 to P6 in powder form. More precisely, the EM1 and EM2 emulsion polymers containing an appropriate amount of LCST macromonomer ($7.5\ 10^{-3}$ mol %) offer a much greater reduction in mobility than that obtained with the EM3 and EM4 emulsion polymers containing an insufficient amount of macromonomer ($10^{-6}$ mol %). EM5 and EM6 emulsion polymers that contain too large a quantity of macromonomer ($2.10^{-1}$ mol %) are not suitable for enhanced oil sweep recovery.

Therefore, due to the presence of an appropriate quantity of LCST macromonomers, the polymers, according to the invention, offer very advantageous properties in the processes for enhanced oil recovery by sweeping.

The invention claimed is:

1. A process of enhanced oil recovery by sweeping an underground formation comprising the following steps:
   preparing an aqueous injection fluid comprising at least one water-soluble copolymer,
   injecting the injection fluid into an underground formation,
   sweeping the underground formation using the injection fluid,
   recovering an aqueous and oily mixture or an aqueous and oily and gaseous mixture,
   wherein the water-soluble copolymer comprises monomeric units resulting from:

a) at least one water-soluble monomer bearing at least one unsaturated function; and
b) at least one Lower Critical Solution Temperature (LCST) macromonomer in an amount greater than $10^{-5}$ mol % and less than $10^{-1}$ mol % based on the total number of moles of water-soluble monomer(s) and LCST macromonomer(s).

2. The process according to claim 1, wherein a molar percentage of LCST macromonomers in the water-soluble copolymer is greater than $10^{-4}$ mol % and less than $10^{-1}$ mol % based on total number of moles of monomers and LCST macromonomers.

3. The process according to claim 1, wherein a molar percentage of LCST macromonomers in the water-soluble copolymer is greater than $10^{-5}$ mol % and less than $9.10^{-2}$ mol % based on total number of moles of monomers and LCST macromonomers.

4. The process according to claim 1, wherein the LCST macromonomer is obtained by radical reaction between an LCST oligomer and a compound containing a double bond, the double bond still being present after said radical reaction.

5. The process according to claim 4, wherein the LCST oligomer has a nitrogen or oxygen atom at its end.

6. The process according to claim 4, wherein the compound containing a double bond is selected from acryloyl chloride, acrylic acid, methacryloyl chloride, methacrylic acid, maleic anhydride, methacrylic anhydride, unsaturated aliphatic isocyanates, allyl chloride, allyl bromide, glycidyl acrylate, and glycidyl methacrylate.

7. The process according to claim 4, wherein the LCST oligomer comprises LCST monomers that are water-soluble monomers selected from non-ionic monomers, anionic monomers, cationic monomers, and zwitterionic monomers.

8. The process according to claim 7, wherein the LCST monomers are selected from a group consisting of N-isopropylacrylamide; N,N-dimethylacrylamide; acryloyl morpholine; N,N-diethyl acrylamide; N-tert-butyl acrylamide; N-vinyl caprolactam; and diacetone acrylamide.

9. The process according to claim 1, wherein the LCST macromonomer is of formula (I):

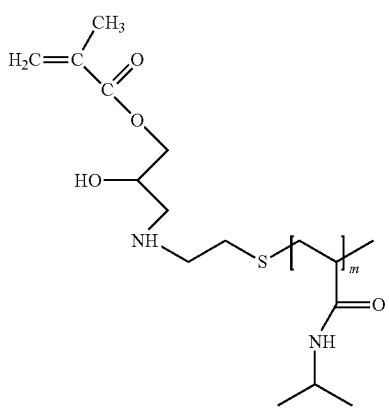

wherein m is an integer between 2 and 40.

10. The process according to claim 1, wherein the LCST macromonomer has a weight average molecular weight between 500 g/mol and 200,000 g/mol.

11. The process according to claim 1, wherein the water-soluble monomers of the water-soluble copolymer bearing at least one unsaturated function are selected from non-ionic monomers, anionic monomers, cationic monomers, and zwitterionic monomers.

12. The process according to claim 4, wherein the water-soluble copolymer comprises non-ionic monomers, and the LCST oligomer comprises non-ionic monomers, these non-ionic monomers being selected from the group consisting of acrylamide; methacrylamide; N-vinylformamide; and N-vinylpyrrolidone.

13. The process according to claim 4, wherein the water-soluble copolymer comprises anionic monomers, and the LCST oligomer comprises anionic monomers, the anionic monomers being selected from the group consisting of acrylic acid; methacrylic acid; itaconic acid; crotonic acid; maleic acid; fumaric acid; 2-acrylamido 2-methylpropanesulfonic acid, vinylsulfonic acid, vinylphosphonic acid, allylsulfonic acid, allylphosphonic acid, styrene sulfonic acid; and the water-soluble salts of these monomers.

14. The process according to claim 1, wherein the water-soluble copolymer has a weight average molecular weight between 0.5 million and 40 million g/mol.

15. The process according to claim 1, wherein the water-soluble copolymer has an association temperature between 25° C. and 160° C.

16. The process according to claim 1, wherein the aqueous injection fluid comprises more than 5% by weight of salts.

17. The process according to claim 1, wherein the underground formation has a maximum temperature between 25° C. and 160° C.

18. The process according to claim 1, wherein:

the LCST macromonomer is obtained by radical reaction between an LCST oligomer and a compound containing a double bond, the double bond still being present after said radical reaction; and the LCST monomers are selected from a group consisting of N-isopropylacrylamide; N,N-dimethylacrylamide; acryloyl morpholine; N,N-diethyl acrylamide; N-tert-butyl acrylamide; N-vinyl caprolactam; and diacetone acrylamide.

19. The process according to claim 1, wherein:

the molar percentage of LCST macromonomers in the water-soluble copolymer is greater than $5.10^{-3}$ mol % based on the total number of moles of monomers and LCST macromonomers;

the molar percentage of LCST macromonomers in the water-soluble copolymer is less than $4.10^{-2}$ mol % based on the total number of moles of monomers and LCST macromonomers;

the LCST macromonomer has a weight average molecular weight between 1,000 and 100,000 g/mol;

the water-soluble copolymer has a weight average molecular weight between 5 million and 30 million g/mol;

the water-soluble copolymer has an association temperature greater than 90° C. and less than or equal to 160° C.; and the aqueous injection fluid comprises more than 10% by weight of salts.

20. The process according to claim 6, wherein:

the LCST macromonomer is of formula (I):

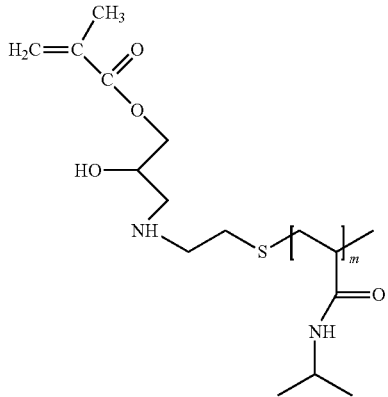

(I)

wherein m is an integer between 2 and 40;

the LCST oligomer comprises LCST monomers that are water-soluble monomers selected from non-ionic monomers and anionic monomers;

the LCST monomers are selected from N-isopropylacrylamide; N,N-dimethylacrylamide; acryloyl morpholine; N,N-diethyl acrylamide; N-tert-butyl acrylamide; N-vinyl caprolactam; and diacetone acrylamide;

the water-soluble copolymer comprises non-ionic monomers, and the LCST oligomer comprises non-ionic monomers, these non-ionic monomers being selected from the group consisting of acrylamide; methacrylamide; N-vinylformamide; N-vinylpyrrolidone; and the water-soluble copolymer comprises anionic monomers, and the LCST oligomer comprises anionic monomers, the anionic monomers being selected from the group consisting of acrylic acid; methacrylic acid; itaconic acid; crotonic acid; maleic acid; fumaric acid; 2-acrylamido 2-methylpropanesulfonic acid, vinylsulfonic acid, vinylphosphonic acid, allylsulfonic acid, allylphosphonic acid, styrene sulfonic acid; and the water-soluble salts of these monomers.

* * * * *